(12) United States Patent
Kominato et al.

(10) Patent No.: US 12,109,898 B2
(45) Date of Patent: Oct. 8, 2024

(54) POWER DEVICE

(71) Applicant: Yazaki Corporation, Tokyo (JP)

(72) Inventors: Yasuhiro Kominato, Makinohara (JP);
Sadaharu Okuda, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 452 days.

(21) Appl. No.: 17/496,180

(22) Filed: Oct. 7, 2021

(65) Prior Publication Data
US 2022/0144096 A1 May 12, 2022

(30) Foreign Application Priority Data

Nov. 11, 2020 (JP) .................................. 2020-187869

(51) Int. Cl.
*B60L 3/00* (2019.01)
*B60L 58/10* (2019.01)

(52) U.S. Cl.
CPC .............. *B60L 3/0046* (2013.01); *B60L 58/10* (2019.02)

(58) Field of Classification Search
CPC .......... B60L 1/003; B60L 1/00; B60L 3/0046; B60L 58/10; B60L 58/18
See application file for complete search history.

(56) References Cited

U.S. PATENT DOCUMENTS

| 2011/0089916 | A1 | 4/2011 | Soenen et al. |
| 2014/0203759 | A1 | 7/2014 | Sugiyama |
| 2018/0287494 | A1* | 10/2018 | Yano ................... H02M 3/1582 |
| 2019/0288523 | A1 | 9/2019 | Matsunaga et al. |
| 2020/0180464 | A1 | 6/2020 | Jang et al. |
| 2022/0158535 | A1 | 5/2022 | Takobe |

FOREIGN PATENT DOCUMENTS

| EP | 1142748 | A2 | | 10/2001 | |
| JP | 2009234489 | A | * | 10/2009 | |
| JP | 2019-161839 | A | | 9/2019 | |
| JP | 6571886 | B2 | * | 9/2019 | ............ H01M 10/44 |
| WO | WO-2018092348 | A1 | * | 5/2018 | ............ H01M 10/44 |

* cited by examiner

*Primary Examiner* — Richard Isla
*Assistant Examiner* — Sadia Kousar
(74) *Attorney, Agent, or Firm* — Sughrue Mion, PLLC

(57) ABSTRACT

A power device to be mounted on a vehicle is provided. The power device includes a battery, a power converter connected between the battery and an auxiliary device, a first capacitor, a first relay connected between the first capacitor and a line connecting the power converter and the auxiliary device, a second capacitor, a second relay connected between the second capacitor and the line connecting the power converter and the auxiliary device, and a controller configured to control the first relay and the second relay, in which the controller turns on the first relay and turns off the second relay when a power switch of the vehicle is ON, and turns off the first relay and turns on the second relay when the power switch of the vehicle is OFF.

5 Claims, 4 Drawing Sheets

POWER DEVICE

BACKGROUND

Technical Field

The present invention relates to a power device.

Related Art

In a power device mounted on a hybrid vehicle or an electric vehicle, a DC/DC converter is disposed between a high-voltage system in which a high-voltage battery that supplies power for traveling is disposed and a low-voltage system in which an auxiliary device that operates at a low voltage is disposed. In such a power device, the DC/DC converter steps down power output from the high-voltage battery, so that power can be supplied from the high-voltage battery to the auxiliary device.

Such power devices include a power device with a low-voltage battery disposed in a low-voltage system in addition to a high-voltage battery (for example, JP 2019-161839 A). Although the low-voltage system normally consumes a small current, a load (for example, power steering) due to temporal consumption of a large current may be present. The low-voltage battery can cope with a fluctuation in power that is a fluctuation in power to be supplied to each load that occurs due to the presence of such a load as above. The low-voltage battery can also provide dark current in a parked state. However, mounting such a low-voltage battery on an automobile is costly, resulting in an increase in the weight of the automobile.

Therefore, as illustrated in FIG. 8, provided is a power device with a capacitor disposed instead of a low-voltage battery. Such a power device constantly stores electric charges in the capacitor, and copes with a fluctuation in power and dark current with the electric charges stored in the capacitor.

Patent Document 1: JP 2019-161839 A

SUMMARY

However, when electric charges are constantly stored in the capacitor, the internal resistance of the capacitor decreases, so that the life of the capacitor decreases.

Therefore, an object of the present invention is to extend the life of a capacitor that copes with a fluctuation in power and dark current.

In order to solve the above issues, a power device of the present invention is a power device to be mounted on a vehicle, the power device including: a battery; a power converter connected between the battery and an auxiliary device; a first capacitor; a first relay connected between the first capacitor and a line connecting the power converter and the auxiliary device; a second capacitor; a second relay connected between the second capacitor and the line connecting the power converter and the auxiliary device; and a controller configured to control the first relay and the second relay, in which the controller turns on the first relay and turns off the second relay when a power switch of the vehicle is ON, and turns off the first relay and turns on the second relay when the power switch of the vehicle is OFF.

The controller may charge the second capacitor with electric charges stored in the first capacitor.

The controller may turn on the second relay when the power switch of the vehicle is turned off, and may turn off the first relay when a first duration elapses after the power switch of the vehicle is turned off.

The controller may charge the first capacitor with electric charges stored in the second capacitor.

The controller may turn on the first relay when the power switch of the vehicle is turned on, and may turn off the second relay when a second duration elapses after the power switch of the vehicle is turned on.

According to the present invention, the life of a capacitor that copes with a fluctuation in power and dark current can be extended.

DETAILED DESCRIPTION OF THE EXEMPLARY EMBODIMENTS

<Power Device 100>

Figure 1:
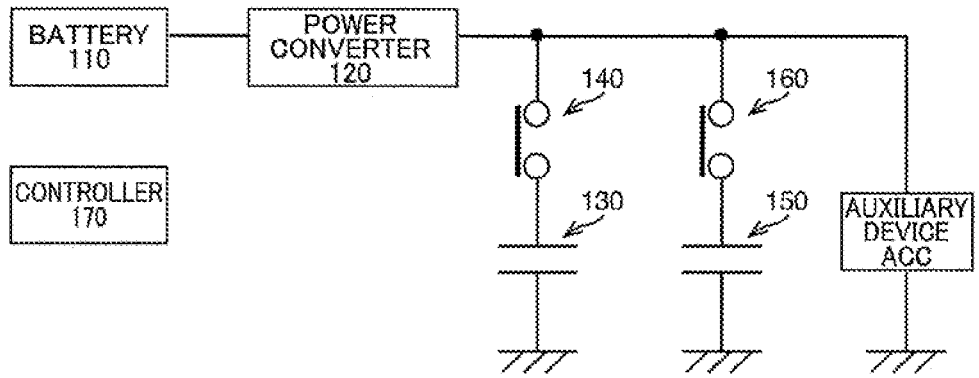
FIG. 1 illustrates a power device 100 according to an embodiment of the present invention.

FIG. 1 illustrates a power device 100 according to an embodiment of the present invention. The power device 100 includes a battery 110, a power converter 120, a first capacitor 130, a first relay 140, a second capacitor 150, a second relay 160, and a controller 170. The power device 100 is mounted on a vehicle such as an automobile.

The battery 110 supplies power. The battery 110 is, for example, a high-voltage battery that supplies power for traveling of the vehicle.

The power converter 120 is connected between the battery 110 and an auxiliary device ACC. The power converter 120 is, for example, a DC/DC converter, and the voltage of power output from the battery 110 is converted by the power converter 120 and supplied to the auxiliary device ACC. Although the single auxiliary device ACC is illustrated in FIG. 1, a plurality of auxiliary devices ACC may be provided.

Figure 2:
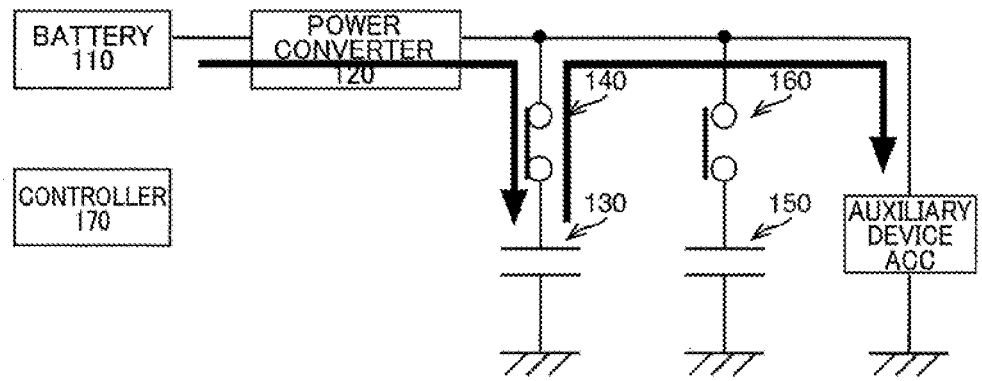
FIG. 2 explanatorily illustrates a flow of power in the power device 100.

The first capacitor 130 is connected to a line connecting the power converter 120 and the auxiliary device ACC through the first relay 140. Thus, in the present embodiment, when the first relay 140 is ON, as illustrated in FIG. 2, the first capacitor 130 can be charged with power supplied from the battery 110 through the power converter 120 and the power charged in the first capacitor 130 can be supplied to the auxiliary device ACC.

Figure 3:
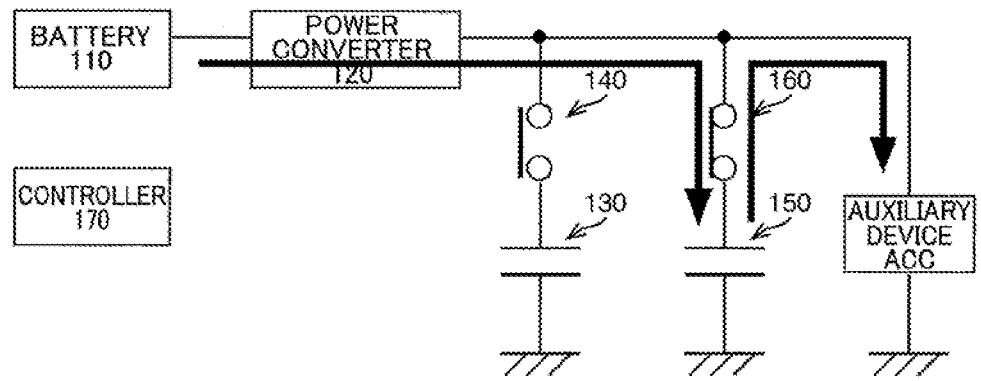
FIG. 3 explanatorily illustrates a flow of power in the power device 100.

The second capacitor 150 is connected to the line connecting the power converter 120 and the auxiliary device ACC through the second relay 160. Thus, in the present embodiment, when the second relay 160 is ON, as illustrated in FIG. 3, the second capacitor 150 can be charged with power supplied from the battery 110 through the power converter 120 and the power charged in the second capacitor 150 can be supplied to the auxiliary device ACC.

The controller 170 controls the first relay 140 and the second relay 160.

The controller 170 turns on the first relay 140 and turns off the second relay 160 when a power switch of the vehicle such as an accessory switch or an ignition switch is ON.

Thus, in the present embodiment, when the power switch of the vehicle is ON, for example, when the vehicle is in use, the first capacitor 130 can be charged with power supplied from the battery 110 through the power converter 120 and the power charged in the first capacitor 130 can be supplied to the auxiliary device ACC. Namely, in the present embodiment, the first capacitor 130 can suppress a fluctuation in power that occurs when the vehicle is in use.

On the other hand, in the present embodiment, when the power switch of the vehicle is ON, the second capacitor 150 is separated from the power converter 120 and the auxiliary device ACC, and thus the second capacitor 150 does not need to store electric charges. Therefore, when the power switch of the vehicle is ON, the controller 170 may cause the second capacitor 150 to discharge such that the second capacitor 150 is brought into a state where no electric charges are stored. Preferably, for example, the positive electrode side (negative electrode side) of the second capacitor 150 may be connected, via a resistor and a switch, to the same electrical potential with the negative electrode side (positive electrode side) of the second capacitor 150. With this arrangement, the controller 170 turns on this switch with the second relay 160 remaining off, to discharge the second capacitor 150. Thus, the second capacitor 150 can be brought into the state where no electric charges are stored.

When the power switch of the vehicle is OFF, the controller 170 turns off the first relay 140 and turns on the second relay 160.

Thus, in the present embodiment, when the power switch of the vehicle is OFF, for example, in a parked state of the vehicle, the second capacitor 150 can be charged with power supplied from the battery 110 through the power converter 120, and the power charged in the second capacitor 150 can be supplied to the auxiliary device ACC. Namely, in the present embodiment, the second capacitor 150 can supply dark current in the parked state. Preferably, when the power switch of the vehicle is OFF, the controller 170, for example, intermittently operates the power converter 120 such that the second capacitor 150 is periodically charged by the battery 110.

On the other hand, in the present embodiment, when the power switch of the vehicle is OFF, the first capacitor 130 is separated from the power converter 120 and the auxiliary device ACC, and thus the first capacitor 130 does not need to store electric charges. Therefore, when the power switch of the vehicle is OFF, the controller 170 may cause the first capacitor 130 to discharge such that the first capacitor 130 is brought into a state where no electric charges are stored. Preferably, for example, the positive electrode side (negative electrode side) of the first capacitor 130 may be connected, via a resistor and a switch, to the same electrical potential with the negative electrode side (positive electrode side) of the first capacitor 130. With this arrangement, the controller 170 turns on this switch with the first relay 140 remaining off, to discharge the first capacitor 130. Thus, the first capacitor 130 can be brought into the state where no electric charges are stored.

As described above, the power device 100 according to the present embodiment includes two capacitors of the first capacitor 130 that suppresses a fluctuation in power and the second capacitor 150 that supplies dark current. In the present embodiment, the first capacitor 130 does not need to store electric charges when the power switch of the vehicle is ON, and the second capacitor 150 does not need to store electric charges when the power switch of the vehicle is OFF. As a result, in the present embodiment, the first capacitor 130 can be brought into the state where no electric charges are stored when the power switch of the vehicle is OFF and the second capacitor 150 can be brought into the state where no electric charges are stored when the power switch of the vehicle is ON. Thus, the lives of the first capacitor 130 and the second capacitor 150 can be extended as compared with a case where the first capacitor 130 and the second capacitor 150 constantly store electric charges.

In addition, in the present embodiment, the first capacitor 130 can be made to have a size suitable for coping with a fluctuation in power, and the second capacitor 150 can be made to have a size suitable for coping with dark current. Thus, an appropriate amount of electric charges can be stored in the first capacitor 130 and the second capacitor 150.

<Charging with Electric Charges Stored in Capacitors>

In order to bring the amount of electric charges stored in the first capacitor 130 to zero, the controller 170 may charge the battery 110 or the second capacitor 150 with the electric charges stored in the first capacitor 130. This arrangement enables effective utilization of the electric charges stored in the first capacitor 130, in order to bring the amount of the electric charges stored in the first capacitor 130 to zero.

Preferably, for example, until the first relay 140 is turned off after the power switch of the vehicle is turned from on to off, the controller 170 operates the power converter 120 such that power flows from the first capacitor 130 to the battery 110. This arrangement enables the electric charges stored in the first capacitor 130 to be used for charging the battery 110.

Figure 4:
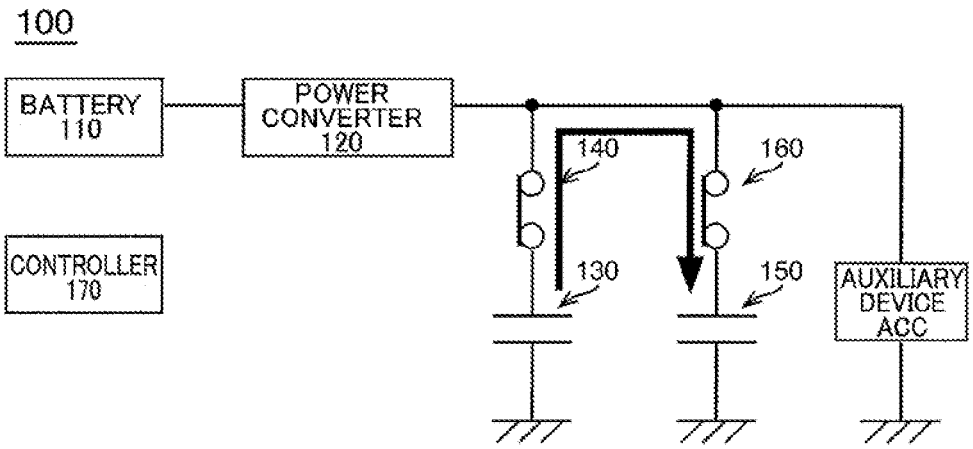
FIG. 4 explanatorily illustrates a flow of power in the power device 100.

Preferably, for example, the controller 170 turns on the second relay 160 when the power switch of the vehicle is turned from on to off, and then turns off the first relay 140 when a first duration elapses after the power switch of the vehicle is turned off. This arrangement enables the electric charges stored in the first capacitor 130 to be used for charging the second capacitor 150 for the first duration because both the first relay 140 and the second relay 160 remain on, as illustrated in FIG. 4. Further, preferably, the controller 170 operates the power converter 120 such that power flows from the first capacitor 130 to the battery 110 for the first duration. This arrangement enables the electric charges stored in the first capacitor 130 to be used for charging both the battery 110 and the second capacitor 150.

Figure 5:
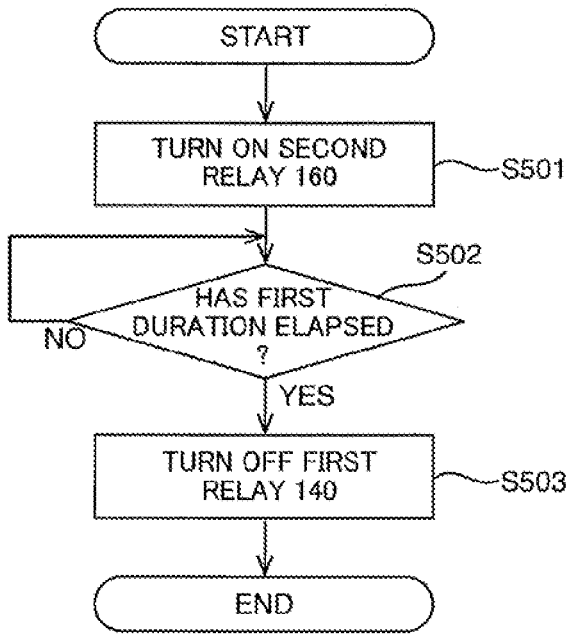
FIG. 5 is a flowchart of an exemplary processing operation in the power device 100 according to the embodiment of the present invention.

FIG. 5 is a flowchart of the processing operation performed when the power switch of the vehicle is turned from on to off in the power device 100 according to the present embodiment. The second relay 160 is turned on (step S501), and when the first duration elapses after the power switch of the vehicle is turned off (YES in step S502), the first relay 140 is turned off (step S503).

Further, in order to bring the amount of electric charges stored in the second capacitor 150 to zero, the controller 170 may charge the battery 110 or the first capacitor 130 with the electric charges stored in the second capacitor 150. This arrangement enables effective utilization of the electric charges stored in the second capacitor 150, in order to bring the amount of the electric charges stored in the second capacitor 150 to zero.

Preferably, for example, until the second relay 160 is turned off after the power switch of the vehicle is turned from off to on, the controller 170 operates the power converter 120 such that power flows from the second capacitor 150 to the battery 110. This arrangement enables the electric charges stored in the second capacitor 150 to be used for charging the battery 110.

Figure 6:
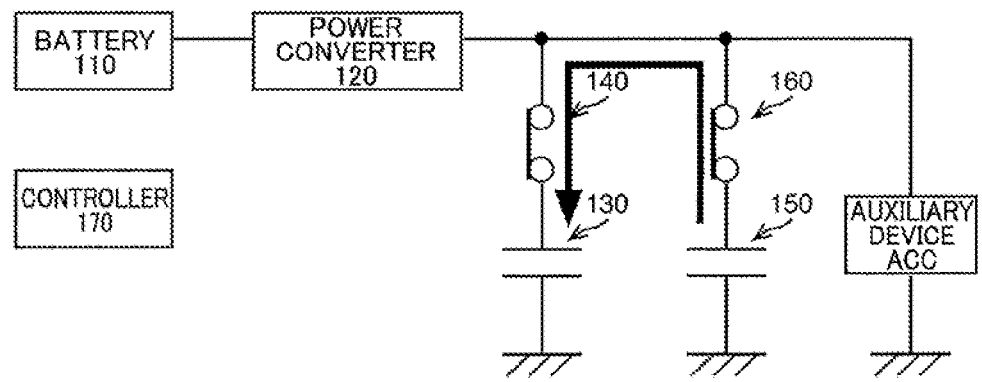
FIG. 6 explanatorily illustrates a flow of power in the power device 100.

Preferably, for example, the controller 170 turns on the first relay 140 when the power switch of the vehicle is turned from off to on, and then turns off the second relay 160 when a second duration elapses after the power switch of the vehicle is turned on. This arrangement enables the electric charges stored in the second capacitor 150 to be used for charging the first capacitor 130 for the second duration because both the first relay 140 and the second relay 160 remain on, as illustrated in FIG. 6. In addition, the electric charges stored in the second capacitor 150 can be used for starting the vehicle. Further, preferably, the controller 170 operates the power converter 120 such that power flows from the second capacitor 150 to the battery 110 for the second duration. This arrangement enables the electric charges stored in the second capacitor 150 to be used for charging both the battery 110 and the first capacitor 130.

Figure 7:
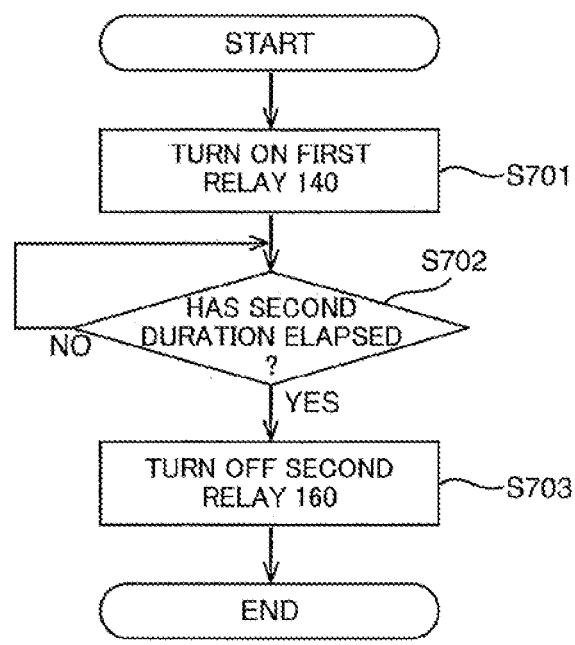
FIG. 7 is a flowchart of an exemplary processing operation in the power device 100 according to the embodiment of the present invention.
Figure 8:
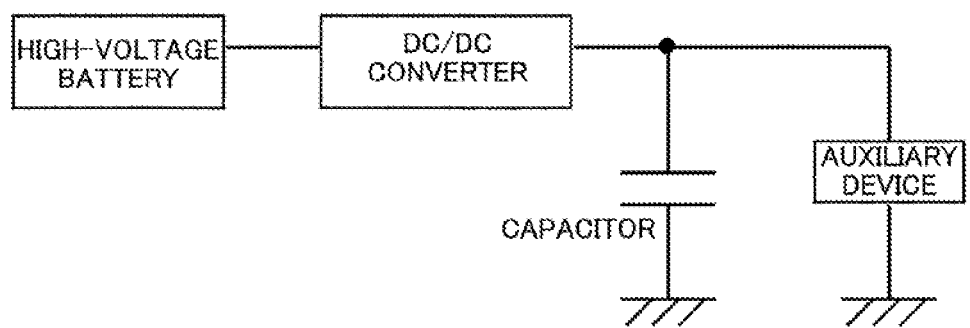
FIG. 8 illustrates an exemplary known power device.

FIG. 7 is a flowchart of the processing operation performed when the power switch of the vehicle is turned from off to on in the power device 100 according to the present embodiment. The first relay 140 is turned on (step S701), and when the second duration elapses after the power switch of the vehicle is turned on (YES in step S702), the second relay 160 is turned off (step S703).

<Disposition of Capacitors>

Preferably, for example, the first capacitor 130 is disposed in the front of the vehicle. A short-term load is often disposed in the front of the vehicle. Thus, the disposition of the first capacitor 130 in the front of the vehicle shortens the wiring distance between the first capacitor 130 and the short-term load, so that power supply from the first capacitor 130 to the short-term load is stable.

Preferably, the second capacitor 150 is disposed at the center of the interior of the vehicle. An auxiliary device that consumes dark current is often disposed in the interior of the vehicle. Thus, the disposition of the second capacitor 150 at the center of the interior of the vehicle shortens the wiring distance between the second capacitor 150 and the auxiliary device that consumes the dark current, so that power supply from the second capacitor 150 to such an auxiliary device is stable.

The present invention has been described above with reference to the preferred embodiment of the present invention. Herein, the specific examples have been given in order to describe the present invention. Various modifications and changes, however, may be made to the specific examples without departing from the gist and scope of the present invention described in the claims.

REFERENCE SIGNS LIST

100 power device
110 battery
120 power converter
130 first capacitor
140 first relay
150 second capacitor
160 second relay
170 controller
ACC auxiliary device

What is claimed is:

1. A power device to be mounted on a vehicle, the power device comprising:
   a battery;
   a power converter connected between the battery and an auxiliary device;
   a first capacitor;
   a first relay connected between the first capacitor and a line connecting the power converter and the auxiliary device;
   a second capacitor;
   a second relay connected between the second capacitor and the line connecting the power converter and the auxiliary device; and
   a controller configured to control the first relay and the second relay,
   wherein the controller is configured to:
      turn on the first relay and turn off the second relay when a power switch of the vehicle is ON to make the second capacitor to enter a state of being separated from the power converter and the auxiliary device, and
      turn off the first relay and turn on the second relay when the power switch of the vehicle is OFF to make the first capacitor to enter a state of being separated from the power converter and the auxiliary device.

2. The power device according to claim 1, wherein the controller is further configured to charge the second capacitor with electric charges stored in the first capacitor.

3. The power device according to claim 2, wherein the controller is further configured to turn on the second relay when the power switch of the vehicle is turned off, and is further configured to turn off the first relay when a first duration elapses after the power switch of the vehicle is turned off.

4. The power device according to claim 1, wherein the controller is further configured to charge the first capacitor with electric charges stored in the second capacitor.

5. The power device according to claim 4, wherein the controller is further configured to turn on the first relay when the power switch of the vehicle is turned on, and is further configured to off the second relay when a second duration elapses after the power switch of the vehicle is turned on.

* * * * *